UNITED STATES PATENT OFFICE.

ALBERT DAVIES, OF STONEHOUSE, PLYMOUTH, ENGLAND.

COLOR PHOTOGRAPHY.

No. 879,445.     Specification of Letters Patent.     Patented Feb. 18, 1908.

Application filed March 12, 1907. Serial No. 361,894.

*To all whom it may concern:*

Be it known that I, ALBERT DAVIES, photographer, a subject of the King of Great Britain, residing at 65 Durnford street, Stonehouse, Plymouth, in the county of Devon, England, have invented certain new and useful Improvements in Color Photography; and I do hereby declare the following to be a full, clear, and exact description of the invention, such as will enable others skilled in the art to which it appertains to make and use the same.

This invention relates to improvements in the production of colored photographs from superimposed primary colored carbon tissues and has more particular reference to the process of preparing and obtaining the blue colors, and half tones, of a more suitable and permanent character than heretofore, and the interdependent process of hardening the transfer papers, their separation from the negative plates and superimposition upon one another to obtain accurate register of the individual prints. It is carried out as follows:—According to usual methods negatives of colored objects are taken through light filters or screens on plates sensitive to color. The negatives are printed on carbon tissues of suitable red, blue and yellow pigments, and the resulting images are then developed and superimposed on one support. In this process owing to the irregular stretching of transfer paper great difficulty is experienced in causing the prints to exactly coincide. According to this invention this difficulty is overcome by hardening the gelatin transfer paper as a whole (as distinguished from merely using paper coated with hardened gelatin), before the prints are put upon it and by mounting the prints as has before been proposed on temporary rigid backings while they are being transferred to the paper.

According to this invention also I employ a blue coloring matter consisting of a mixture of Prussian blue and picric acid which turns the blue into a blue green, which color will assimilate much better with the yellow and red than the ordinary blue and is much more permanent than the anilin colors commonly employed.

The following description applies to a three color photograph. I sensitize the carbon tissues in about three per cent. solution of bichromate of potash for three minutes and then hang them up to dry. The red and yellow tissues are those ordinarily employed, but the blue tissues should be prepared with Prussian blue (Turnbull's blue). To the blue sensitizing bath I add about four ounces of a concentrated solution of picric acid to eighty ounces of about a three cent. solution of bichromate of potash, or the picric acid may be added to the blue emulsion when making the tissue, or the blue print can be manipulated with a solution of picric acid while on the glass plate to improve the half tones of the picture. All the tissues should be dried in an airtight calcium chlorid box and heat should not be used.

Positive prints are obtained upon the carbon tissues from the color negatives in the ordinary manner. The tissues are then soaked in cold water until limp, and are transferred to glass plates which have been rubbed with French chalk and then coated with collodion which has been allowed to set but not to dry and has been washed in clean water. Or the French chalk may be replaced by a mixture of asbestos and talc, or of carbonate of magnesia, and arrowroot. Care must be taken not to put too much pressure on the squeegee used in transferring the tissues to the plates. After a few minutes the plates with the tissues on them are soaked in hot water 100° Fahrenheit for a few minutes and the paper on the back of the tissue is removed. The prints are then developed and washed. The yellow print is fixed by means of a weak solution of formalin, or a solution of alum may be used if desired. The blue and red prints should only be fixed in a weak solution of formalin and simply well washed and put to dry. Any good white or tinted double transfer gelatin coated paper is suitable for the final support of the prints. The transfer paper is soaked in cold water for a few minutes, then in about a ten per cent. solution of alum (or a weak solution of formalin) for one minute and is well washed, and is placed upon the yellow print while it is still wet and the two are well squeezed together. When the yellow print has become dry, it and the transfer paper are separated from the glass plate by a sharp knife. The yellow print having been successfully transferred the next step taken is with the blue one. Both the red and blue prints are transferred from the glass plates in the same manner but a solution consisting of one part by weight of *Placaria lichenoides* in 400 parts of water is desirable to insure adherence. The solution is strained and used at a temperature not over 95° Fahrenheit. The blue print while still on the glass backing is placed on a leveling stand and the solution is poured over it. The yellow print previously soaked in cold water is placed on the top of it and then slightly squeezed. The two prints can be registered by looking through the glass of the blue print. The prints are dried on the glass plate and are then separated from it as before. The red print is transferred in exactly the same manner as the blue. It is advisable after the red print has been transferred to paste a piece of double transfer paper which has been soaked in alum (or formalin) water and then washed, to the back of the paper of final support while on the glass plate with the gelatin outside. This will keep the finished print flat when it is detached from the glass. If any of the three prints appear to be too dense when temporarily superimposed they can, if not over printed, be reduced by gently rubbing with cotton wool and methylated spirits.

I do not bind myself to superimpose the pigment tissues in the order mentioned, for instance in making transparencies it is better to place the blue first the yellow second and the red last but in any case the operator can decide which order will best suit the object.

Since the blue pigment tissue produces the shades and dark effects in any given picture it follows that in this particular color it is of the utmost importance that it not only be permanent but assimilate well with the other colors, and I have found that these qualifications are satisfied when it is prepared as above indicated, besides giving the operator full power to enhance or depress any portion of the picture by stippling with the picric acid solution when the blue tissue is on the plate.

What I claim is:

1. The process of producing colored photographs, which consists in first printing the same picture on sensitized pigment tissues of different colors, then attaching the said tissues to prepared plates, then removing the paper from the backs of the tissues and developing and fixing the pictures while on the said plates, and finally superimposing the said pictures on a single sheet of transfer paper.

2. The process of producing colored photographs, which consists in first printing the same picture on sensitized pigment tissues of different colors, then attaching the said tissues to prepared plates, then removing the paper from the backs of the tissues and developing and fixing the pictures while on the said plates, and finally superimposing the fixed pictures upon a single sheet of gelatin transfer paper which has been hardened before applying the pictures to it.

3. The process of producing colored photographs, which consists in printing the picture on blue pigment tissue which has been treated with picric acid and bichromate of potash, and printing the same picture on sensitized pigment tissues of other colors, then attaching the said tissues to prepared plates, then removing the paper from the backs of the tissues and developing and fixing the pictures while on the said plates, and finally superimposing the said pictures on a single sheet of transfer paper.

4. The process of producing colored photographs, which consists in first printing the same picture on sensitized pigment tissues of different colors, then attaching the said tissues to prepared plates, then removing the papers from the backs of the tissues and developing and fixing the pictures while on the said plates, reducing any picture which is too thick by rubbing it with spirits before removing it from its plate, and finally superimposing the said pictures on a single sheet of transfer paper.

5. The process of producing colored photographs, which consists in first printing the same picture on sensitized pigment tissues of different colors, then attaching the said tissues to glass plates which have been treated with chalky material and then coated with collodion, then removing the paper from the backs of the tissues and developing and fixing the pictures while on the said plates, and finally superimposing the said pictures on a single sheet of transfer paper.

6. The process of producing colored photographs, which consists in first printing the same picture on sensitized pigment tissues of different colors, then attaching the said tissues to prepared plates, then removing the paper from the backs of the tissues and developing and fixing the pictures while on the said plates, then transferring one of the said pictures onto a sheet of gelatin transfer paper, treating the said sheet and picture with an adhesive solution, and superimposing the remaining pictures onto the said sheet.

In testimony whereof I affix my signature in presence of two witnesses.

ALBERT DAVIES.

Witnesses:
E. YOUNGS,
W. WALKE.